July 21, 1959
C. E. S. PLACE
2,895,368
BOLT HAVING ROLLED GROOVES AND RECESSED
HEAD TO ENHANCE UNIFORM ELONGATION
Filed Jan. 21, 1955
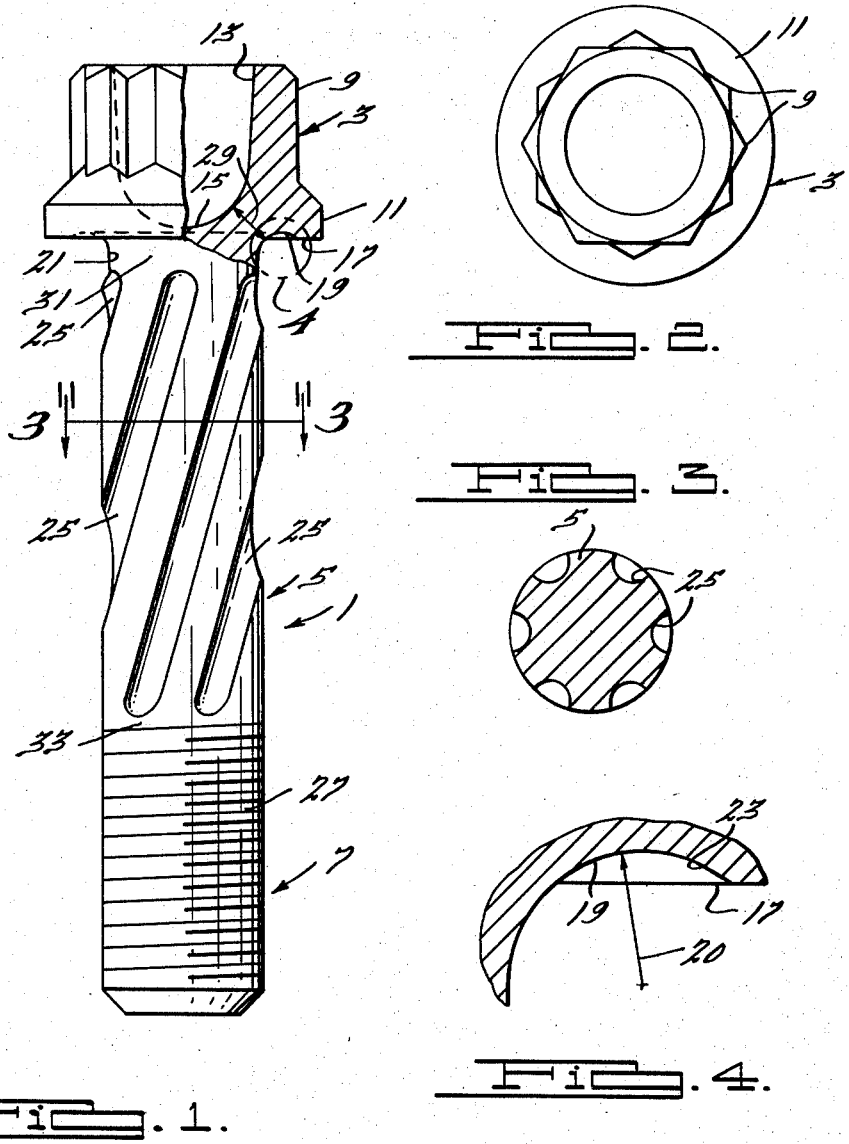
INVENTOR.
Charles E. S. Place.
BY
Harness, Dickey & Pierce.
ATTORNEYS.

United States Patent Office 2,895,368

Patented July 21, 1959

2,895,368
BOLT HAVING ROLLED GROOVES AND RECESSED HEAD TO ENHANCE UNIFORM ELONGATION

Charles E. S. Place, Detroit, Mich.; Isobel Place, Paul R. Trigg, Jr., and National Bank of Detroit, coexecutors of said Charles E. S. Place, deceased Application January 21, 1955, Serial No. 483,366

2 Claims. (Cl. 85—1)

My invention relates to high tension bolts, studs, and the like and, in particular, refers to bolts that will conform in dimensional detail, material, heat treatment, physicals, finish, and otherwise to Air Corps and aircraft manufacturers' specifications for high tension bolts. This application is a continuation-in-part of my copending application Serial No. 389,058, filed October 29, 1953.

As discussed in more detail in my copending application, it has been an object of bolt designers to improve the elastic elongation of bolts without introducing outweighing disadvantages, such as substantially increased cost of manufacture, loss of bearing surface to resist transaxial (shear) loads, or use of non-standard design. My copending application discloses and claims an optimum design for achieving increased elastic elongation by providing shallow grooves in the surface of the shank of the bolt.

It is the purpose of this invention to adapt the use of such grooves to high tension bolts, in particular twelve-point, external wrenching, high tension, aircraft bolts, and to incorporate other features that will still further increase the elastic elongation. The invention carries with it the extremely important advantages of reducing the weight of the bolt, eliminating irregularities of shape and cross section which might act as points of stress concentration, and providing a bolt shape that is more uniformly stressed than heretofore throughout its entire length, including the head of the bolt itself. This has been done in the present invention by making only relatively slight changes in the form of standard high tension aircraft bolts of the type mentioned, and no changes in dimensional details, so that the practical problems associated with radical innovations in the aircraft field are avoided.

The invention is illustrated in its presently preferred form in the drawings wherein:

Figure 1 is a side elevation, partly broken away, of a twelve-point, external wrenching, high tension, aircraft bolt embodying the invention;

Fig. 2 is a plan view of the bolt of Fig. 1 showing the head thereof;

Fig. 3 is a cross section along line 3—3 of Fig. 1; and

Fig. 4 is an enlarged view of the structure within the circle 4 of Fig. 1 showing the undercut radius with tapered outer periphery.

The bolt 1 that is illustrated conforms dimensionally at four times scale to a standard 5/16–24 (N.F. 3A Thd.), twelve point, external wrenching, high tension, aircraft bolt, Spec. Mil–S–7742. These bolts are used to work at stresses in the neighborhood of 185,000–190,000 p.s.i. and are preferably made from alloy aircraft steel, such as 4340, heat treated to the range of 260,000–280,000 p.s.i. tensile strength. The bolt has a head 3, a body or shank 5, and a threaded portion 7, the threads on the specific bolt illustrated preferably having a root radius of .005″ min. The head 3 has the twelve wrenching points 9 and the enlarged bottom circular flange portion 11 which are standard. There is a recess 13 in the top of the head 3 and in accordance with this invention it is extended down deep into the head so that the spherical bottom 15 thereof lies in a plane that is close to the bottom seating or bearing surface 17 on the flange 11. Also according to the invention there is an undercut 19 in the surface 17. The undercut is preferably formed on about the same radius 20 (illustrated as .047/.037 inch) as used in standard bolts of this type but its center is moved up (to provide the undercut) by an amount (.012/.008 inch for the specific bolt illustrated) that can be determined because of other limitations mentioned herein and moved inwardly toward the center line of the bolt by one-half the difference between the blank diameter 21 of the present bolt and the shank diameter of a standard bolt of this type. The outer edge or periphery of undercut 19 is preferably formed on a tangent 23 to the radius 20 that makes an angle of preferably 30 degrees with the surface 17. The annular surface 17 as illustrated has a minimum width of 3/64 inch and in general has an area that is preferably no less than what I may refer to as the "critical" area of the bolt, this nowadays being usually taken as the mean equivalent area of the threads. This limitation plus the standard specified size of the head 3 and portion 11 (illustrated as .526±.005 inch) will control the maximum depth of undercut 19. It will be recognized that in its broader aspects the invention may be practiced without using an undercut 19 but it is strongly preferred as it reduces stress concentration at the corner between the shank and surface 17.

The shank 5 has a series of shallow, semicircular, helical grooves 25 formed therein and these are uniformly spaced around the outside surface of the shank. They run for as near to the entire length of the shank as possible and are preferably on the same hand as the threads and on a helix angle of 75 degrees. The shank and threads are preferably simultaneously formed by roller dies from a round blank of uniform diameter, the blank diameter being controlled by the threads determined in accordance with standard thread rolling practice. It is, of course, substantially less than the O.D of the threads and more than the root diameter of threads, being substantially the thread pitch diameter. The roller dies for the shank 5 are spaced apart by the proper distance to produce a shank of standard O.D. for the particular bolt being rolled (which is .3117/.3102 for the bolt illustrated) but the surfaces of the dies have projecting ribs shaped to form the grooves 25. The number of grooves used is arbitrary but in order to give satisfactory groove and land dimensions and proper rolling characteristics I prefer to use 6 grooves on 5/16 and 3/8 inch diameter bolts, 7 grooves on 7/16 inch diameter, and 8 grooves on 1/2 inch diameter, it being a matter of cut and try to determine the optimum number for the various size bolts. The 5/16 bolt illustrated has 6 grooves of .037 inch radius. Knowing the number, the size of the grooves can be determined since their total area equals the difference between the area computed with the standard shank O.D. and the area computed with the blank diameter. Preferably, I multiply this difference in area by 0.9 in order to positively avoid having excess metal in the shank when the grooves are rolled, thus insuring smooth rolling. This factor is empirical and may be changed slightly if actual rolling conditions warrant. The object is to correct for radii on the dies, tolerances in the stock, etc., and obtain just enough metal to fill out the major shank diameter. It also tends to insure breakage in the threads. Dividing this corrected difference in areas by the number of grooves gives the area of each groove, and since the grooves are semicircular, it is a simple matter to determine the diameter of each. This diameter is also used for the ribs on the dies, the pitch of the ribs being determined by dividing the circumference of the mean roll thread blank diameter by the number of grooves.

It will be seen that the cross sectional area through the shank 5 will be substantially equal to the area at pitch diameter since no metal is removed in rolling the grooves 25. This area is close enough to the theoretical stressed area of the threads 27, i.e., the mean equivalent area, to result in substantially uniform stressing along the length of the shank 5 and threads 7. If it is thought to be necessary to get even more nearly uniform stressing, the blank from the which bolt is rolled can be made of two diameters and the blank diameter of the shank portion 5 can then be based on the mean equivalent area, the root area, or other critical area that the designer may decide defines the resistance of the threads 27, and the grooves of proper size, shape, and number rolled into it so as to increase the outer diameter of the shank up to the standard shank O.D. for bolts of this type. However, as indicated above, it is considered good practice to make the shank area at least large enough so that failure will not occur in the threads.

The depth of the recess 13 is selected so that the minimum section 29 has an area preferably about ten percent larger than the mean equivalent area of threads and in only rare cases should it be smaller than the critical area through the threads. In the bolt illustrated the shortest distance between the bottom of recess 13 and undercut 19 (i.e. width of section 29) is .076 inch minimum. This will impart flexibility to the head 3 and increase the elastic elongation of the bolt 1 as a whole. The reduction in shank area by means of grooves 25 without loss of bearing diameter against shear loads also increases elastic elongation as pointed out in my copending case.

The grooves 25 are brought up as close to surface 17 as possible. The space or head clearance portion 31 between the ends of the grooves and the surface 17 (as illustrated being .075/.045 inch) is such as to permit the insertion of tools for a secondary operation (cold working) on the fillet or undercut 19. Adjacent the threads 27, the clearance 33 between the ends of the grooves and the beginning of the threaded portion is preferably held to a minimum.

While the grooves 25 and threads 27 can be cold rolled into the blank, the head 3 may be hot formed in a combined induction heating and hot forming process on the selected blank diameter.

I claim:

1. A high tension bolt or the like of the type described comprising a solid shank having a plurality of substantially parallel, shallow rolled grooves in the surface thereof spaced circumferentially around the outside thereof and running for substantially the full length thereof, a threaded portion on one end of the shank, a head on the other end of the shank having a bearing surface extending perpendicularly to the axis of the shank, a head clearance portion of the shank immediately adjacent said surface being of blank diameter but of the same cross sectional area as the grooved portion of the shank, said bearing surface being provided with an annular undercut on a radius tangent to said clearance portion, said head having a recess thereon opening out of the top and having a substantially semi-spherical bottom, said recess extending downwardly to such a depth and said undercut radius being of a length such that the area of the minimum head section between the bottom of the recess and said undercut is approximately the same as the critical area of the threaded portion, the area of said shank being substantially constant over the full length thereof and approximately the same as the critical area of the threaded portion, said radius of said undercut being of a length such that the area of said bearing surface is substantially equal to the critical area of the threaded portion and the radial width of said undercut is approximately equal to the radial width of said bearing surface.

2. The invention set forth in claim 1 wherein the radially outermost portion of said undercut is formed on a tangent to said radiused surface which extends at an angle of approximately thirty degrees to said bearing surface.

References Cited in the file of this patent

UNITED STATES PATENTS

| | | |
|---|---|---|
| 440,331 | Rogers | Nov. 11, 1890 |
| 446,740 | Jones | Feb. 17, 1891 |
| 470,804 | Jones | Mar. 15, 1892 |
| 1,966,044 | Place et al. | July 10, 1934 |
| 2,006,276 | Nodiere | June 25, 1935 |